US011741127B2

(12) United States Patent
Liu et al.

(10) Patent No.: US 11,741,127 B2
(45) Date of Patent: Aug. 29, 2023

(54) DYNAMIC RANGE PARTITIONING OF DATABASE TABLE

(71) Applicant: SAP SE, Walldorf (DE)

(72) Inventors: Xiaoke Liu, Xian (CN); Qingwei Ren, Xian (CN); Zhe Qu, Xian (CN); Zhilong Hao, Xian (CN); Weimin Qi, Xian (CN); Long Zhang, Xian (CN); Jiaxin Liu, Xian (CN); Xiaolong Yang, Xian (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/512,379

(22) Filed: Oct. 27, 2021

(65) Prior Publication Data

US 2023/0129468 A1    Apr. 27, 2023

(51) Int. Cl.
*G06F 16/27* (2019.01)
*G06F 16/2453* (2019.01)
*G06F 16/22* (2019.01)

(52) U.S. Cl.
CPC ........ *G06F 16/278* (2019.01); *G06F 16/2282* (2019.01); *G06F 16/24542* (2019.01)

(58) Field of Classification Search
CPC ........................... G06F 16/278; G06F 16/2282
USPC ........................................................ 707/715
See application file for complete search history.

(56) References Cited

U.S. PATENT DOCUMENTS

| | | | | |
|---|---|---|---|---|
| 6,092,062 A | * | 7/2000 | Lohman | G06F 16/24542 |
| | | | | 707/999.005 |
| 6,920,460 B1 | * | 7/2005 | Srinivasan | G06F 16/2282 |
| | | | | 707/999.102 |
| 11,442,933 B2 | * | 9/2022 | Bellamkonda | G06F 16/24553 |
| 2011/0138148 A1 | * | 6/2011 | Friedman | G06F 3/0613 |
| | | | | 711/E12.001 |
| 2016/0140174 A1 | * | 5/2016 | Weyerhaeuser | G06F 16/24542 |
| | | | | 707/718 |
| 2019/0294469 A1 | * | 9/2019 | Voss | G06F 9/4881 |
| 2019/0340274 A1 | * | 11/2019 | Keller | G06F 16/2282 |

* cited by examiner

*Primary Examiner* — Muluemebet Gurmu
(74) *Attorney, Agent, or Firm* — Mintz Levin Cohn Ferris Glovsky and Popeo, P.C.

(57) ABSTRACT

A method may include generating a database table to include a first partition having a first range and a dynamic partition associated with an undefined range of a specified length. A record may be inserted into the database table. In response to one or more values of the record being outside of the first range of the first partition, a second partition having a second range of the specified length that includes the one or more values of the record may be generated. The record may be stored in the second partition. Moreover, a query on the database table may be executed by the first partition and/or the second partition of the database table. Related systems and articles of manufacture are also provided.

16 Claims, 8 Drawing Sheets

DYNAMIC RANGE PARTITIONING OF DATABASE TABLE

TECHNICAL FIELD

The subject matter described herein relates generally to database processing and more specifically to the dynamic range partitioning of a database table.

BACKGROUND

A database may be configured to store an organized collection of data. For example, data held in a relational database may be organized in accordance with a schema defining one or more relations, each of which being a set of tuples sharing one or more common attributes. The tuples of a relation, each of which corresponding to a record, may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for dynamic range partitioning of a database table. In some example embodiments, there is provided a system that includes at least one processor and at least one memory. The at least one memory may include program code that provides operations when executed by the at least one processor. The operations may include: generating a database table to include a first partition having a first range and a dynamic partition associated with an undefined range of a specified length; receiving a first statement inserting a first record into the database table; in response to a first value of the first record being outside of the first range of the first partition, generating a second partition having a second range of the specified length that includes the first value of the first record; storing the first record in the second partition; and executing a query on the database table by at least accessing the first partition and/or the second partition of the database table.

In some variations, one or more features disclosed herein including the following features can optionally be included in any feasible combination. The operations may further include: generating the second partition by at least replacing an undefined range of the dynamic partition with the second range; and generating another dynamic partition having the undefined range of the specified length.

In some variations, the operations may further include: storing the first record in the second partition by at least moving the first record from the dynamic partition to the second partition.

In some variations, the operations may further include: receiving a second statement inserting a second record into the database table; and in response to a second value of the second record being outside of the first range of the first partition and the second range of the second partition, generating a third partition having a third range of the specified length that includes the second value of the second record.

In some variations, the operations may further include: receiving a second statement dropping one or more empty partitions from the database table; in response to the second statement, determining that the first partition is empty; and in response to the first partition being empty, combining the first partition with a non-empty partition having a third range that precedes or follows the first range of the first partition.

In some variations, the database table may be generated in response to a second statement defining the database table to include the first partition having the first range and the dynamic partition associated with the interval of the specified length.

In some variations, the first partition may be stored in a first node of a distributed database system and the second partition may be stored in a second node of the distributed database system.

In some variations, the operations may further include: in response to determining that the second partition is not required by the query, pruning the second partition from the query; and generating, for the query, an execution plan that avoids accessing the second partition.

In some variations, the second partition may be generated in response to the inserting of the first record.

In some variations, the second partition may be generated as a part of a periodic process.

In some variations, the second partition may be generated in response to a user input.

In another aspect, there is provided a method for dynamic range partitioning of a database table. The method may include: generating a database table to include a first partition having a first range and a dynamic partition associated with an undefined range of a specified length; receiving a first statement inserting a first record into the database table; in response to a first value of the first record being outside of the first range of the first partition, generating a second partition having a second range of the specified length that includes the first value of the first record; storing the first record in the second partition; and executing a query on the database table by at least accessing the first partition and/or the second partition of the database table.

In some variations, one or more features disclosed herein including the following features can optionally be included in any feasible combination. The method may further include: generating the second partition by at least replacing an undefined range of the dynamic partition with the second range; and generating another dynamic partition having the undefined range of the specified length.

In some variations, the method may further include: storing the first record in the second partition by at least moving the first record from the dynamic partition to the second partition.

In some variations, the method may further include: receiving a second statement inserting a second record into the database table; and in response to a second value of the second record being outside of the first range of the first partition and the second range of the second partition, generating a third partition having a third range of the specified length that includes the second value of the second record.

In some variations, the method may further include: receiving a second statement dropping one or more empty partitions from the database table; in response to the second statement, determining that the first partition is empty; and in response to the first partition being empty, combining the first partition with a non-empty partition having a third range that precedes or follows the first range of the first partition.

In some variations, the database table may be generated in response to a second statement defining the database table to include the first partition having the first range and the dynamic partition associated with the interval of the specified length.

In some variations, the method may further include: in response to determining that the second partition is not required by the query, pruning the second partition from the query; and generating, for the query, an execution plan that avoids accessing the second partition.

In some variations, the second partition may be generated in response to the inserting of the first record, as a part of a periodic process, and/or in response to a user input.

In another aspect, there is provided a computer program product including a non-transitory computer readable medium storing instructions. The instructions may cause operations may executed by at least one data processor. The operations may include: generating a database table to include a first partition having a first range and a dynamic partition associated with an undefined range of a specified length; receiving a first statement inserting a first record into the database table; in response to a first value of the first record being outside of the first range of the first partition, generating a second partition having a second range of the specified length that includes the first value of the first record; storing the first record in the second partition; and executing a query on the database table by at least accessing the first partition and/or the second partition of the database table.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to query processing in an in-memory database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
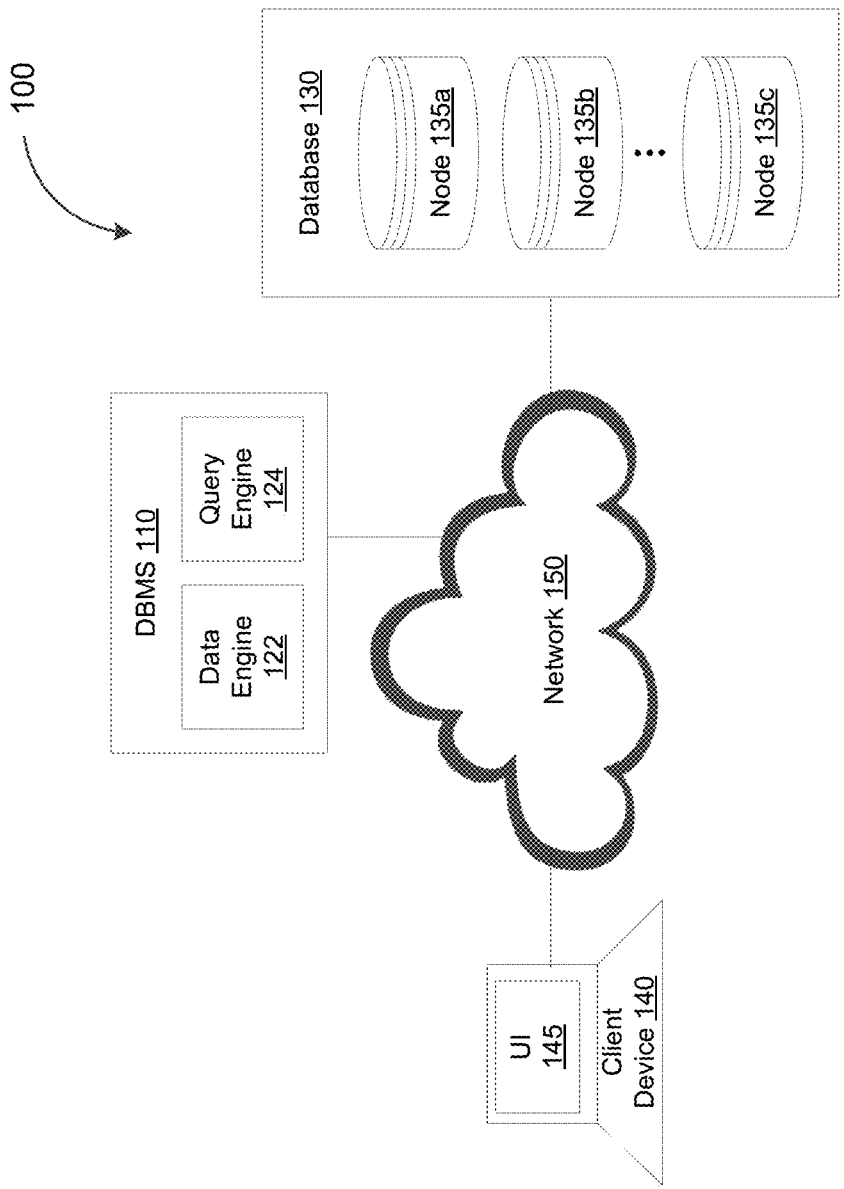
FIG. 1 depicts a system diagram illustrating an example of a database system, in accordance with some example embodiments.

An in-memory relational database may utilize main memory for the primary storage of database tables. In some cases, the in-memory relational database may be implemented as a column-oriented database (or a columnar database) that stores data from database tables by columns instead of by rows. As noted, each tuple of a relation may correspond to a record occupying one row of a database table while the columns of the database table may store the values of the common attributes shared by multiple tuples. Thus, in the columnar database, the values occupying each column of the database table, which may span multiple rows (or records) of the database table, may be stored sequentially in one or more data pages, with each data page storing at least a portion of a column. The in-memory column-oriented relational database may support efficient data compression and partitioning for massively parallel processing. Moreover, because the in-memory database is directly accessible by the central processing unit (CPU) of the computing engine, transactions accessing the in-memory database may be executed to provide near-instantaneous results.

The throughput and storage capacity of a database, such as an in-memory column—oriented relational database, may be maximized by distributing the processing and storage of data across multiple computing nodes. For example, a single database table may be divided into multiple partitions (or internal tables) and stored across multiple computing nodes. Data from the database table may be distributed across the partitions in a variety of manner. With hash partitioning, for example, each row (or record) of the database table may be assigned to a partition based on the hash value of the data occupying one or more columns identified as the partitioning columns. In round-robin partitioning, the rows (or records)

of the database table are assigned to the partitions on a rotation basis. In the case of range partitioning, each partition may be associated with certain values or ranges of values and each row (or record) of the database tables may be assigned to a partition based on the data occupying the one or more partitioning columns being within the range of values associated with the partition. In some cases, the distribution of data may be performed based on various combinations of hash partitioning, round-robin partitioning, and range partition such as hash-range partitioning, round-robin range partitioning, and range-range partitioning.

A database table that is range partitioned may be defined to include a first partition associated with a specified range and a second partition associated with an unspecified range. As such, records with values within the specified range may be stored in the first partition while records with other values not within the specified range may be stored in the second partition. In cases where the database table is defined to include a third partition associated with another specified range, the second partition may store records with values that are within neither the specified range of the first partition nor the specified range of the third partition. Because the second partition is associated with an unspecified range, the second partition is likely to become inundated with an excessive quantity of data. This over concentration of data at the second partition may reduce the speed and computational efficiency of a query on the database table. For example, the execution of the query may include searching indiscriminately through the entire second partition even though a large proportion of the data stored in the second partition may be irrelevant to the query.

As such, in some example embodiments, instead of a single partition having an unspecified range for storing records whose values are outside of the specified ranges of the other partitions, the database table may be defined to include a dynamic partition that is associated with a specified range. For example, the definition of the database table may specify the size of the range covered by each of the one or more dynamically generated partitions. Upon the insertion of a value that is not within the specified range of a first partition of the database table, a second partition with a range corresponding to the value may be generated dynamically for storing the value.

FIG. 1 depicts a system diagram illustrating an example of a database system 100, in accordance with some example embodiments. Referring to FIG. 1, the database system 100 may include a database management system 110 having a data engine 122 and a query engine 124, a database 130, and a client device 140. As shown in FIG. 1, the query engine 124, the database 130, and the client device 140 may be communicatively coupled via a network 150. The database 130 may be a relational database including, for example, an in-memory database, a column-based database, a row-based database, and/or the like. The client 130 can be a processor-based device including, for example, a mobile device, a wearable apparatus, a personal computer, a workstation, an Internet-of-Things (IoT) appliance, and/or the like. The network 150 may be a wired network and/or a wireless network including, for example, a public land mobile network (PLMN), a local area network (LAN), a virtual local area network (VLAN), a wide area network (WAN), the Internet, and/or the like.

The database 130 may be a distributed database in which the processing and storage of data is distributed across multiple computing nodes including, for example, a first node 135a, a second node 135b, a third node 135c, and/or the like. Accordingly, to store a database table 160 at the database 130, the data engine 122 may divide the database table 160 into multiple partitions by applying one or more of a hash partitioning, round-robin partitioning, and range partitioning. For example, the database table 160 may be divided into a first partition 165a, a second partition 165b, and a third partition 165c. Moreover, in the example shown in FIG. 1, the first partition 165a may be stored at the first node 135a, the second partition 165b may be stored at the second node 135b, and the third partition 165c may be stored at the third node 135c.

To further illustrate, the structured query language (SQL) CREATE TABLE statement below may define the database table 160 to include the first partition 165a, the second partition 165b, and the third partition 165c.

```
CREATE TABLE T (A INT, B INT)
PARTITION BY RANGE(A)
(PARTITION 0 <= VALUES < 100,
PARTITION 100 <= VALUES < 200,
PARTITION OTHERS)
```

Figure 2:
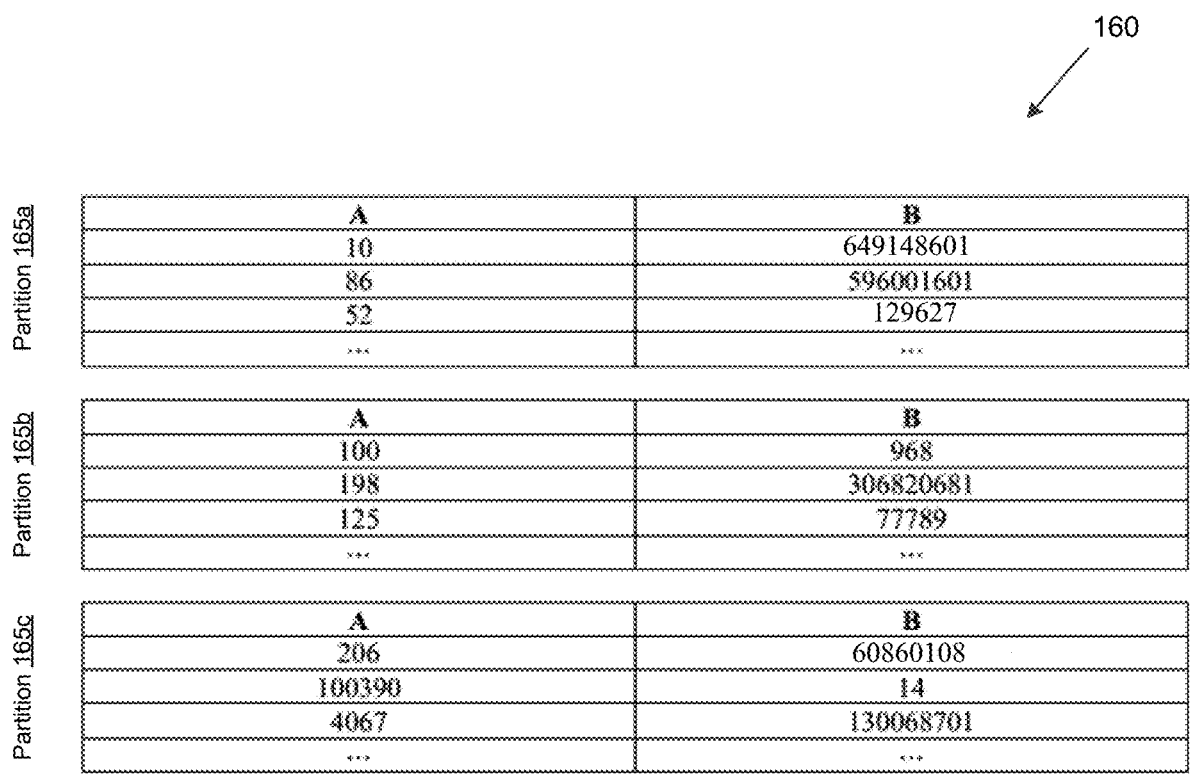
FIG. 2 depicts an example of a partitioned database table, in accordance with some example embodiments.

According to the SQL statement, the database table 160 may include a first column A and a second column B, each being occupied by values having the datatype INT (e.g., an integer value). The SQL statement may further partition the database table 160 into multiple partitions based on the range of values occupying the first column A. For example, the first partition 165a may be defined include records in which the values occupying the first column A is within a first range $R_1$ between the values 0 and 99 while the second partition 165b may be defined to include records in which the values occupying the first column A is within a second range $R_2$ between the values 100 and 199. Moreover, the third partition 165c of the database table 160 may be defined to include a third range $R_3$, which in this example includes records with all other values occupying the first column A. That is, the third partition 165c of the database table 160 may include records in which the values occupying the first column A is within neither the first range $R_1$ nor the second range $R_2$. FIG. 2 depicts an example of the database table 160 that the data engine 122 may create based on the foregoing SQL statement.

In the example of the database table 160 shown in FIG. 2, the third partition 165c of the database table 160 may be defined to include records (or rows of the database table 160) in which the values occupying the first column A is neither within the first range $R_1$ of the first partition 165a nor the second range $R_2$ of the second partition 165b. As such, the third partition 165c may become inundated with an excessive quantity of data that belong in neither the first partition 165a nor the second partition 165b. This over concentration of data at the third partition 165c may reduce the speed and computational efficiency of a query on the database table 160. For example, the execution of the query may include searching indiscriminately through the entire third partition 165c even though a large proportion of the data stored in the third partition 165c may be irrelevant to the query. The over concentration of data in the third partition 165c may be avoided by imposing a limit on the quantity of data stored in the third partition 165c. For instance, once the third partition 165c reaches a threshold quantity of data (e.g., 100 records), an additional partition with an unspecified range and the same storage limit may be allocated. Nevertheless, limiting each partition to a threshold quantity of data merely avoids an over concentration of data in any one partition but does not improve the computational efficiency of a query that requires searching through the partitions without a specified range.

As such, in some example embodiments, instead of the third partition 165c being defined to have an unspecified range for storing records with values are outside of the specified ranges of the other partitions, the database table 160 may be defined to include one or more dynamically generated partitions that are associated with a specified range. For example, the definition of the database table 160 may specify the size of the range covered by each of the one or more dynamically generated partitions. Upon the insertion of a value that is not within the specified range of an existing partition of the database table 160, for example, another partition with a range corresponding to the value may be generated dynamically for storing the value. Dynamically generating partitions with a specified range may improve the speed and computational efficiency of a query on the database table 160 at least by enabling the pruning of partitions not required for the query. For instance, if the query engine 124 receives a query on the database table 160 that specifies one or more values (or range of values), the query engine 124 may generate an execution plan for the query that avoids accessing partitions of the database table 160 that do not contain the specified values (or range of values).

To further illustrate, the SQL statement below may define the database table 160 to include a dynamic partition that is associated with an interval of two years.

```
CREATE TABLE T (A DATE NOT NULL, B INT)
PARTITION BY RANGE(YEAR(A))
(PARTITION '2010' <= VALUES < '2020',
PARTITION OTHERS DYNAMIC INTERVAL
2 YEAR
```

Figure 3A:
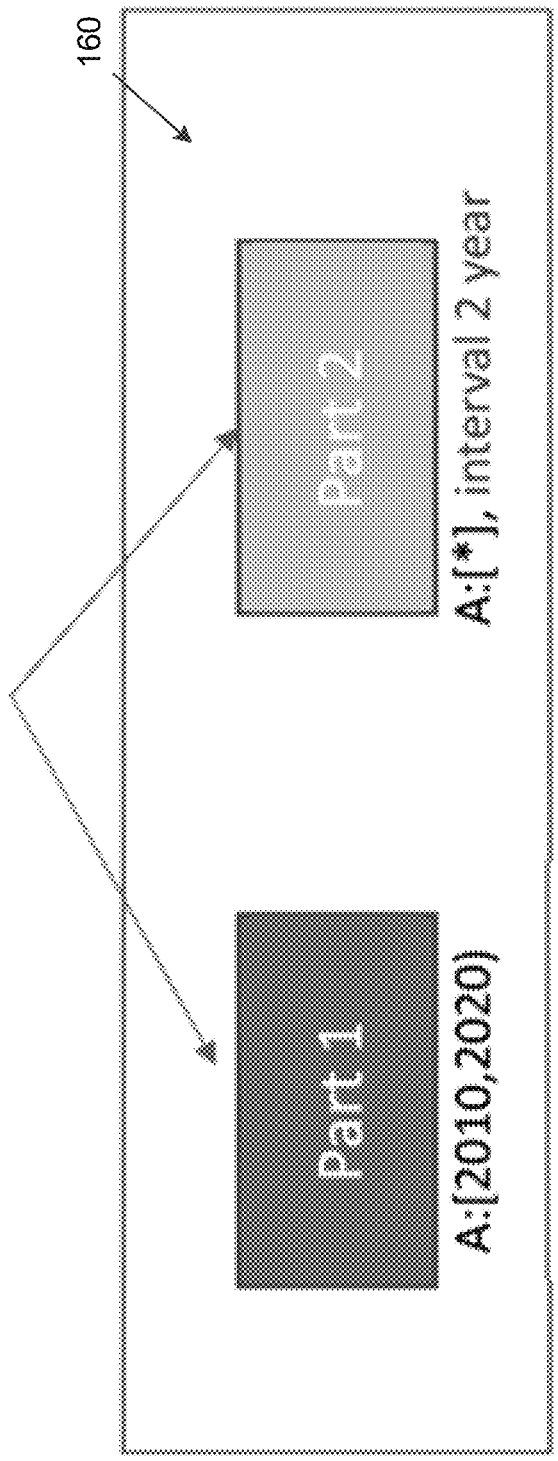
FIG. 3A depicts a schematic diagram illustrating an example of dynamic range partitioning, in accordance with some example embodiments.

FIG. 3A depicts a schematic diagram illustrating an example of the database table 160 that the data engine 122 may create based on the foregoing SQL statement. As shown in FIG. 3A, the database table 160 may be defined to include a first partition Part 1 that is associated with the range A:[2010, 2020) and a second partition Part 2, which is a dynamic partition associated with an undefined range A:[*] spanning an interval of two years. In some example embodiments, one or more partitions may be created upon the insertion of values that are not within the range A: [2010, 2020) associated with the first partition Part 1.

Figure 3B:
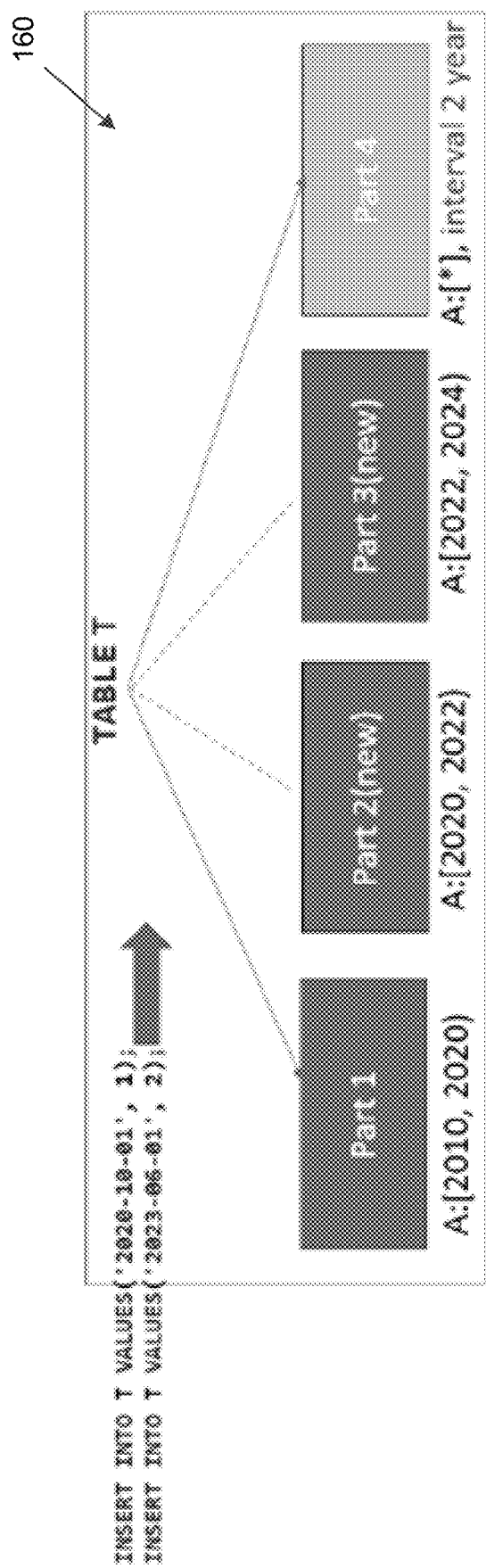
FIG. 3B depicts a schematic diagram illustrating another example of dynamic range partitioning, in accordance with some example embodiments.

FIG. 3B depicts a schematic diagram illustrating an example of data being inserted into the database table 160. In the example shown in FIG. 3B, the first record ('2020-10-01', 1) and the second record ('2023-06-01', 2) are being inserted into the database table 160 but neither values are within the range A: [2010, 2020) associated with the first partition Part 1. Accordingly, as shown in FIG. 3B, the data engine 122 may respond to the insertion of the first record ('2020-10-01', 1) and the second record ('2023-06-01', 2) by generating a second partition Part 2 with the range A:[2020, 2022) and a third partition Part 3 with the range A: [2022, 2024) while a fourth partition Part 4 remains the dynamic partition associated with an undefined range A:[*] spanning an interval of two years. Moreover, the data engine 122 may move the first record ('2020-10-01', 1) into the second partition Part 2 and the second record ('2023-06-01', 2) into the third partition Part 3.

Generating new partitions and moving a large quantity of data thereto may increase the latency associated with storing data in the database 130. As such, in some example embodiments, the dynamic generation of partitions and the movement of data to the dynamically generated partitions may not occur automatically upon the insertion of data such as the first record ('2020-10-01', 1) and the second record ('2023-06-01', 2). Instead, the dynamic generation of partitions and the movement of data to the dynamically generated partitions may be performed periodically, for example, at certain time intervals. Alternatively and/or additionally, the dynamic generation of partitions and the movement of data to the dynamically generated partitions may be triggered by one or more user inputs, such as an explicit SQL statement, received from the client device 140.

Figure 3C:
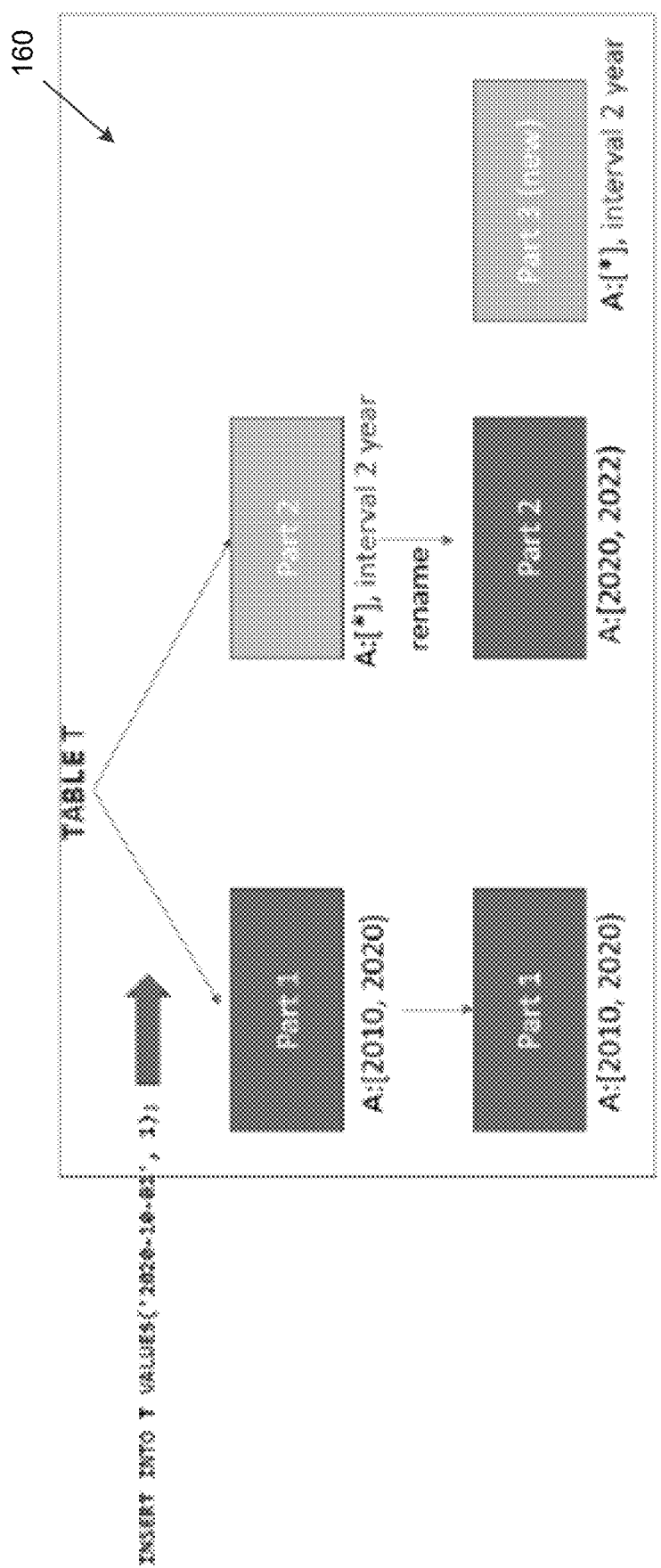
FIG. 3C depicts a schematic diagram illustrating another example of dynamic range partitioning, in accordance with some example embodiments.

The dynamic generation of a partition may be a faster operation than moving data from an existing partition to the dynamically generated partition at least because different partitions of the database table 160 may be stored at different nodes of the database 130. For example, the first partition Part 1 may be stored at the first node 135a, the second partition Part 2 may be stored at the third node 135b, and/or the like. As such, in some example embodiments, the rate at which data may be inserted into the database 130 may be increased by minimizing the movement of data between existing partitions and dynamically generated partitions. For example, FIG. 3C shows that upon inserting the first record ('2020-10-01', 1), the data engine 110 may rename the second partition Part 2 such that the second partition Part 2 is associated with the range A: [2020, 2022). As such, the first record ('2020-10-01', 1) may be stored in the renamed second partition Part 2 while the third partition Part 3 with the unspecified range A: [*] may be created to replace the second partition Part 2. The renaming of the second partition Part 2 and the generation of the third partition Part 3 may be accomplished faster than moving the first record ('2020-10-01', 1) from the second partition Part 2 to the third partition Part 3, which may reside on different nodes of the database 130.

Figure 3D:
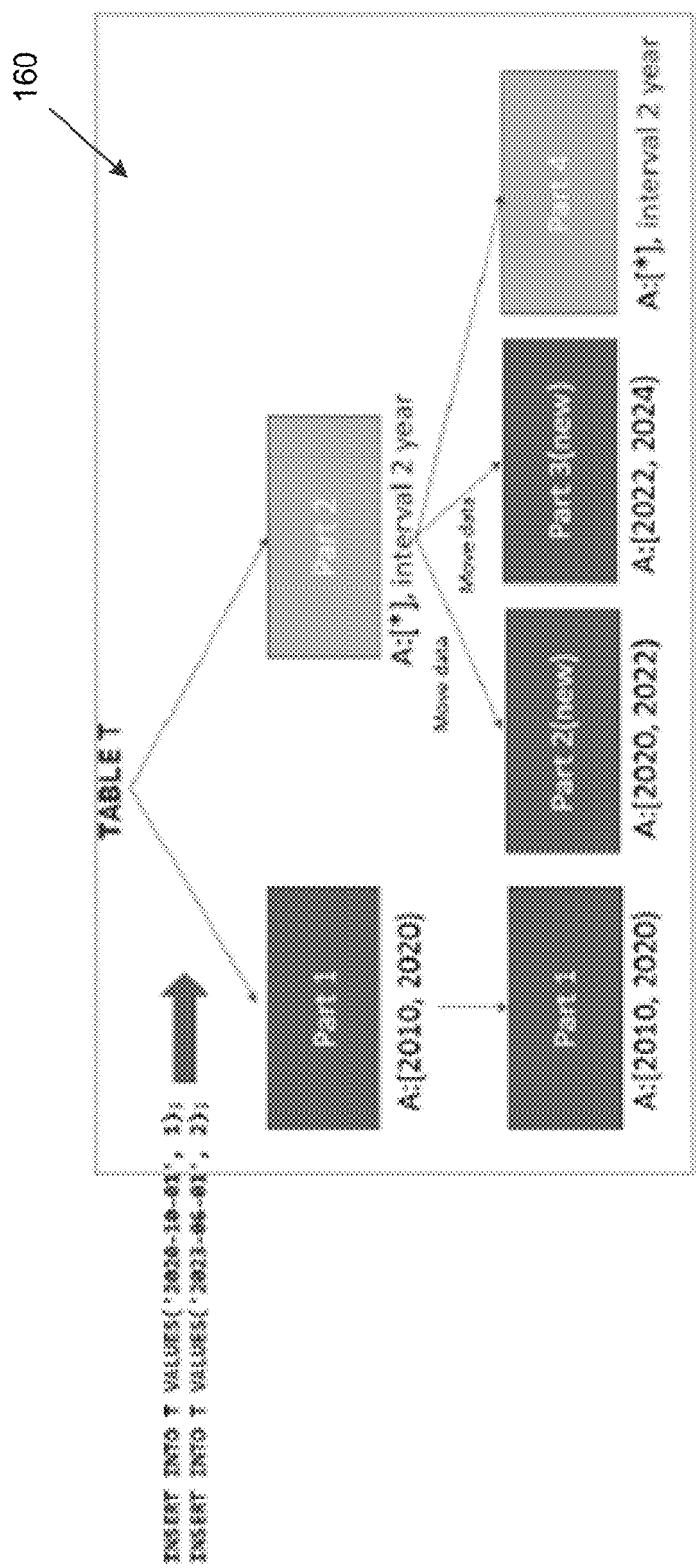
FIG. 3D depicts a schematic diagram illustrating another example of dynamic range partitioning, in accordance with some example embodiments.

The movement of data may be unavoidable in cases where multiple partitions are generated in response to the insertion of data into the database table 160. FIG. 3D depicts a schematic diagram illustrating the insertion of the first record ('2020-10-01', 1) and the second record ('2023-06-01', 2) into the database table 160. As shown in FIG. 3D, a second partition Part 2 having the range A: [2020, 2022) and a third partition Part 3 having the range A: [2022, 2024) may be generated in response to the insertion of the first record ('2020-10-01', 1) and the second record ('2023-06-01', 2). Doing so may necessitate moving the first record ('2020-10-01', 1) to the second partition Part 2 and the second record ('2023-06-01', 2) to the third partition Part 3. The existing second partition Part 2, which is associated with the undefined range A:[*] may become the fourth partition Part 4 without being replaced to cover a defined range, as in the case shown in FIG. 3C.

In some cases, the dynamic generation of partitions may result in the presence of empty partitions. For example, upon the insertion of the first record ('2020-10-01', 1) and the second record ('2023-06-01', 2), the data engine 122 may generate the second partition Part 2, the third partition Part 3, and one or more intervening partitions between the first partition Part 1, the second partition Part 2, and the third partition Part 3. At least some of the partitions of the database table 160 may remain empty over time. As such, in some example embodiments, the data engine 122 may support the removal of empty partitions. For example, in response to an ALTER TABLE statement to drop empty partitions (e.g., ALTER TABLE T DROP EMPTY PARTI- TIONS), the data engine 122 may combine an empty partition with a non-empty partition whose range precedes (or follows) the range of the empty partition. In the example shown in FIG. 3B, if the first partition Part 1 is empty upon receipt of the ALTER TABLE statement, the data engine 122 may combine the first partition Part 1 with the second partition Part 2 to form a new partition having the combined range A: [2010, 2022).

Figure 4:
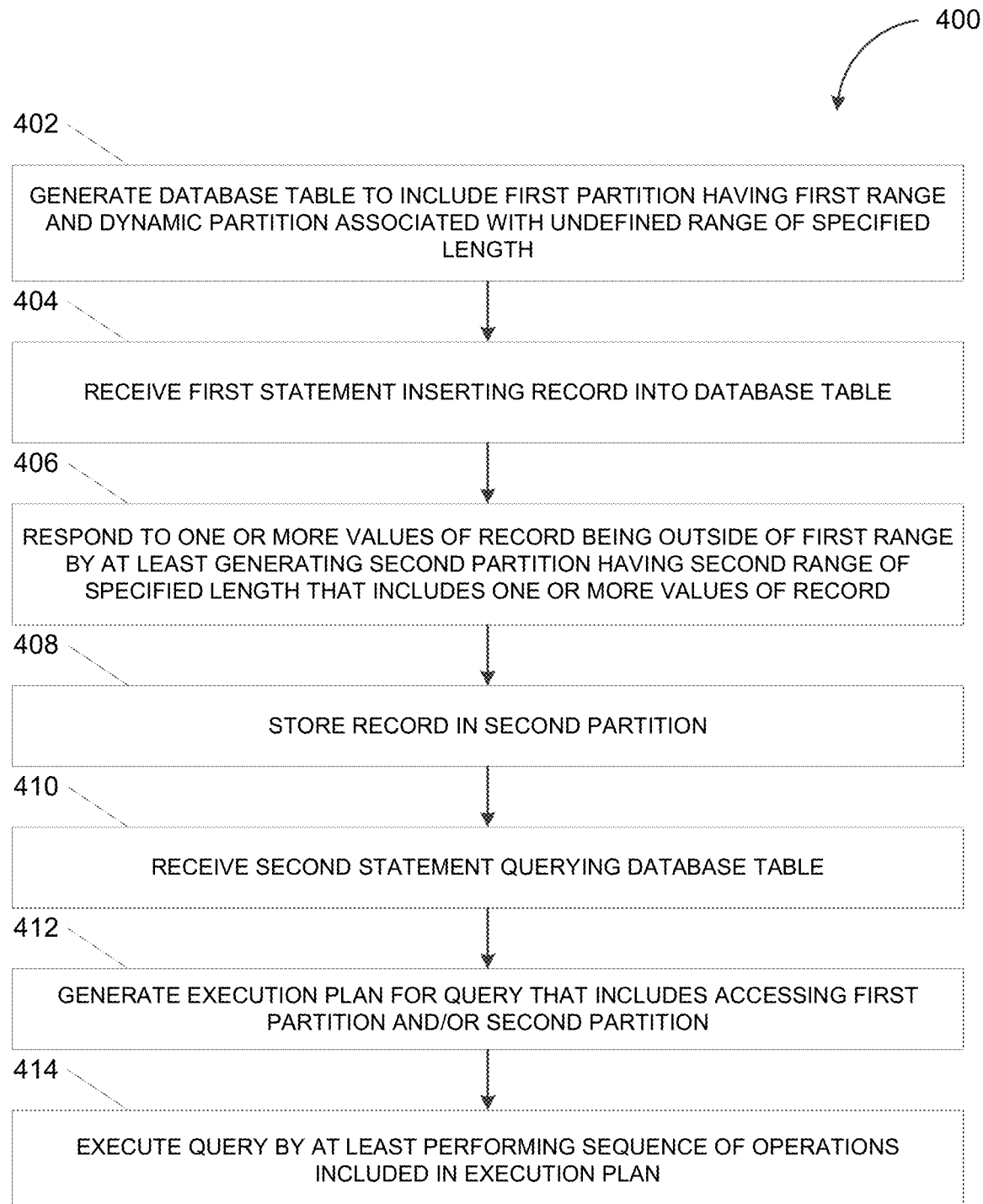
FIG. 4 depicts a flowchart illustrating an example of a process for dynamic range partitioning of a database table, in accordance with some example embodiments.

FIG. 4 depicts a flowchart illustrating an example of a process 400 for processing a query, in accordance with some example embodiments. Referring to FIGS. 1-4, the process 400 may be performed by the database management system 110 including, for example, the data engine 122 and the query engine 124. For example, the process 400 may be performed to insert data into the database table 160 and execute a query on the database table 160. Data from the database table 160 may be range partitioned into multiple partitions, for example, the first partition 165a, the second partition 165b, and the third partition 165c. Moreover, the first partition 165a may be stored at the first node 135a, the second partition 165b may be stored at the second node 135b, and the third partition 165c may be stored at the third node 135c. As such, executing the query on the database table 160 may include executing the query on one or more partitions of the database table 160.

At 402, the database management system 110 may generate a database table to include a first partition having a first range and a dynamic partition associated with an undefined range of a specified length. For example, referring to FIG. 3A, the data engine 122 may receive the SQL statement, which defines the database table 160 to include the first partition Part 1 associated with the range A: [2010, 2020) and the dynamic second partition Part 2 associated with an undefined range A:[*] spanning an interval of two years.

At 404, the database management system 110 may receive a first statement inserting a record into the database table. For example, as shown in FIGS. 3B and 3D, the data engine 122 may receive statements inserting the first record ('2020-10-01', 1) and the second record ('2023-06-01', 2) into the database table 160 but neither values are within the range A: [2010, 2020) associated with the first partition Part 1.

At 406, the database management system 110 may respond to one or more values of the record being outside of the first range of the first partition by generating a second partition having a second range of the specified length that includes the one or more values of the record. In some example embodiments, the data engine 110 may respond to the insertion of the first record ('2020-10-01', 1) and the second record ('2023-06-01', 2) by generating a second partition Part 2 with the range A:[2020, 2022) and a third partition Part 3 with the range A:[2022, 2024). The second partition Part 2 may be generated with a 2-year range that includes the first record while the third partition Part 3 may be generated with a 2-year range that includes the second record. The data engine 110 may generate the second partition Part 2 and the third partition Part 3 in order to accommodate the first record ('2020-10-01', 1) and the second record ('2023-06-01', 2). As such, in some cases, the data engine 110 may generate the second partition Part 2 and/or the second partition Part 3 automatically, for example, upon the insertion of the first record ('2020-10-01', 1) and the second record ('2023-06-01', 2). Alternatively, the second partition Part 2 and/or the second partition Part 3 may be generated as a part of a periodic process that is performed at set time intervals and/or in response to a user input, such as an explicit SQL statement, received from the client device 140.

At 408, the database management system 110 may store the record in the second partition. In some example embodiments, the rate at which data may be inserted into the database 130 may be improved by minimizing the movement of data between existing partitions and dynamically generated partitions. For example, FIG. 3C shows that the insertion of the first record ('2020-10-01', 1) may be accomplished by replacing the undefined range of the second partition Part 2 with the range A: [2020, 2022). As such, the first record ('2020-10-01', 1) may be stored in the renamed second partition Part 2 while the third partition Part 3 with the unspecified range A: [*] may be created to replace the second partition Part 2. Alternatively, an example where the movement of data is unavoidable is shown in FIG. 3D, in which a second partition Part 2 having the range A: [2020, 2022) and a third partition Part 3 having the range A: [2022, 2024) are generated in response to the insertion of the first record ('2020-10-01', 1) and the second record ('2023-06-01', 2). The first record ('2020-10-01', 1) is moved from the existing second partition Part 2 to the new second partition Part 2 while the second record ('2023-06-01', 2) is moved from the existing second partition Part 2 to the third partition Part 3.

At 410, the database management system 110 may receive a second statement querying the database table. For example, the query engine 124 may receive a query on the database table 160 that requires modifying and/or analyzing at least a portion of data included in the database table 160.

At 412, the database management system 110 may generate an execution plan for the query that includes accessing the first partition and/or the second partition. In some example embodiments, the query engine 124 may generate an execution plan, which may include a sequence of operations for executing the query. The query engine 124 may apply one or more optimizations in order to generate an execution plan that maximizes the speed and computational efficiency of the query. To that end, dynamically generated partitions with a specified range may improve the speed and computational efficiency of the query on the database table 160 at least by enabling the pruning of partitions not required for the query. For example, if the query engine 124 receives a query on the database table 160 that specifies one or more values (or range of values), the query engine 124 may generate the execution plan to avoid accessing portions of the database table 160 that do not contain the specified values (or range of values).

At 414, the database management system 110 may execute the query by at least performing the sequence of operations included in the execution plan. For example, the query engine 124 may execute the query based on the execution plan, which may be generated to avoid accessing one or more partitions of the database table 160 not required for the query.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: generating a database table to include a first partition having a first range and a dynamic partition associated with an undefined range of a specified length; receiving a first statement inserting a first record into the database table; in response to a first value of the first record being outside of the first range of the first partition, generating a second partition having a second range of the specified length that includes the first value of the first record; storing the first record in the second partition; and executing a query on the database table by at least accessing the first partition and/or the second partition of the database table.

Example 2: The system of example 1, wherein the operations further include: generating the second partition by at least replacing an undefined range of the dynamic partition with the second range; and generating another dynamic partition having the undefined range of the specified length.

Example 3: The system of any one of examples 1 to 2, wherein the operations further include: storing the first record in the second partition by at least moving the first record from the dynamic partition to the second partition.

Example 4: The system of any one of examples 1 to 3, wherein the operations further include: receiving a second statement inserting a second record into the database table; and in response to a second value of the second record being outside of the first range of the first partition and the second range of the second partition, generating a third partition having a third range of the specified length that includes the second value of the second record.

Example 5: The system of any one of examples 1 to 4, wherein the operations further include: receiving a second statement dropping one or more empty partitions from the database table; in response to the second statement, determining that the first partition is empty; and in response to the first partition being empty, combining the first partition with a non-empty partition having a third range that precedes or follows the first range of the first partition.

Example 6: The system of any one of examples 1 to 5, wherein the database table is generated in response to a second statement defining the database table to include the first partition having the first range and the dynamic partition associated with the interval of the specified length.

Example 7: The system of any one of examples 1 to 6, wherein the first partition is stored in a first node of a distributed database system, and wherein the second partition is stored in a second node of the distributed database system.

Example 8: The system of any one examples 1 to 7, wherein the operations further include: in response to determining that the second partition is not required by the query, pruning the second partition from the query; and generating, for the query, an execution plan that avoids accessing the second partition.

Example 9: The system of any one of examples 1 to 8, wherein the second partition is generated in response to the inserting of the first record.

Example 10: The system of any one of examples 1 to 9, wherein the second partition is generated as a part of a periodic process.

Example 11: The system of any one of examples 1 to 10, wherein the second partition is generated in response to a user input.

Example 12: A method, comprising: generating a database table to include a first partition having a first range and a dynamic partition associated with an undefined range of a specified length; receiving a first statement inserting a first record into the database table; in response to a first value of the first record being outside of the first range of the first partition, generating a second partition having a second range of the specified length that includes the first value of the first record; storing the first record in the second partition; and executing a query on the database table by at least accessing the first partition and/or the second partition of the database table.

Example 13: The method of example 12, further comprising: generating the second partition by at least replacing an undefined range of the dynamic partition with the second range; and generating another dynamic partition having the undefined range of the specified length.

Example 14: The method of any one of examples 12 to 13, further comprising: storing the first record in the second partition by at least moving the first record from the dynamic partition to the second partition.

Example 15: The method of any one of examples 12 to 14, further comprising: receiving a second statement inserting a second record into the database table; and in response to a second value of the second record being outside of the first range of the first partition and the second range of the second partition, generating a third partition having a third range of the specified length that includes the second value of the second record.

Example 16: The method of any one of examples 12 to 15, further comprising: receiving a second statement dropping one or more empty partitions from the database table; in response to the second statement, determining that the first partition is empty; and in response to the first partition being empty, combining the first partition with a non-empty partition having a third range that precedes or follows the first range of the first partition.

Example 17: The method of any one of examples 12 to 16, wherein the database table is generated in response to a second statement defining the database table to include the first partition having the first range and the dynamic partition associated with the interval of the specified length.

Example 18: The method of any one examples 12 to 17, wherein the operations further include: in response to determining that the second partition is not required by the query, pruning the second partition from the query; and generating, for the query, an execution plan that avoids accessing the second partition.

Example 19: The method of any one of examples 12 to 18, wherein the second partition is generated in response to the inserting of the first record, as a part of a periodic process, and/or in response to a user input.

Example 20: A non-transitory computer readable medium storing instructions, which when executed by at least one data processor, result in operations comprising: generating a database table to include a first partition having a first range and a dynamic partition associated with an undefined range of a specified length; receiving a first statement inserting a first record into the database table; in response to a first value of the first record being outside of the first range of the first partition, generating a second partition having a second range of the specified length that includes the first value of the first record; storing the first record in the second partition; and executing a query on the database table by at least accessing the first partition and/or the second partition of the database table.

Figure 5:
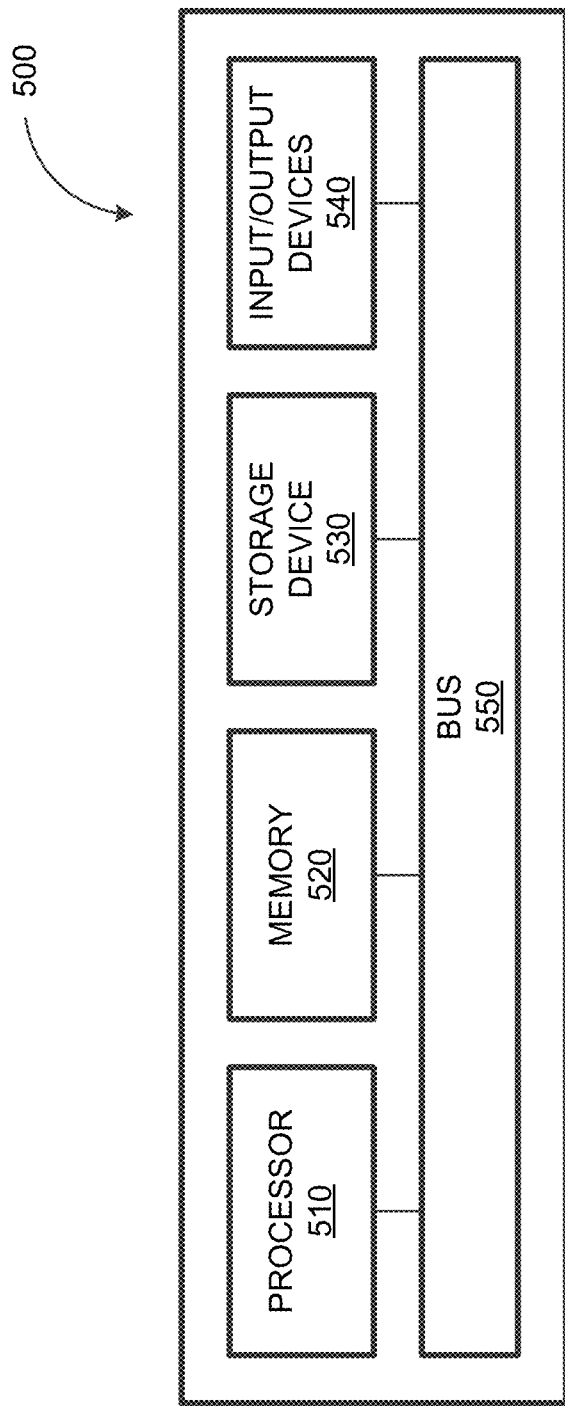
FIG. 5 depicts a block diagram illustrating a computing system, in accordance with some example embodiments.

FIG. 5 depicts a block diagram illustrating an example of a computing system 500 consistent with implementations of the current subject matter. Referring to FIGS. 1-5, the computing system 500 may implement the database management system 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database management system 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, cause operations comprising:
        generating a database table to include a first partition having a first range and a first dynamic partition associated with an undefined range of a specified length;
        receiving a first statement inserting a first record into the database table;
        in response to a first value of the first record being outside of the first range of the first partition, generating a second partition by at least replacing the undefined range of the first dynamic partition with a second range of the specified length that includes the first value of the first record, and generating a second dynamic partition having the undefined range of the specified length;
        storing the first record in the second partition; and
        executing a query on the database table by at least determining, based at least on the second range of the second partition, that the second partition of the database table is not required by the query, pruning the second partition from the query in response to determining that the second partition is not required by the query, and generating an execution plan for the query that avoids accessing the second partition of the database table.

2. The system of claim 1, wherein the second partition is further generated by at least renaming the first dynamic partition to be associated with the second range such that the first record is inserted in the database table without moving the first record from the first dynamic partition to the second partition.

3. The system of claim 1, wherein the operations further comprise:
    receiving a second statement inserting a second record into the database table; and
    in response to a second value of the second record being outside of the first range of the first partition and the second range of the second partition, generating a third partition by at least replacing the second dynamic partition with a third range of the specified length that includes the second value of the second record, and generating a third dynamic partition having the undefined range of the specified length.

4. The system of claim 1, wherein the operations further comprise:
    receiving a second statement dropping one or more empty partitions from the database table;
    in response to the second statement, determining that the first partition is empty; and
    in response to the first partition being empty, combining the first partition with a non-empty partition having a third range that precedes or follows the first range of the first partition.

5. The system of claim 1, wherein the database table is generated in response to a second statement defining the database table to include the first partition having the first range and the first dynamic partition associated with the undefined range of the specified length.

6. The system of claim 1, wherein the first partition is stored in a first node of a distributed database system, and wherein the second partition is stored in a second node of the distributed database system.

7. The system of claim 1, wherein the second partition is generated in response to the inserting of the first record.

8. The system of claim 1, wherein the second partition is generated as a part of a periodic process.

9. The system of claim 1, wherein the second partition is generated in response to a user input.

10. A computer-implemented method, comprising:
    generating a database table to include a first partition having a first range and a first dynamic partition associated with an undefined range of a specified length;
    receiving a first statement inserting a first record into the database table;
    in response to a first value of the first record being outside of the first range of the first partition, generating a second partition by at least replacing the undefined range of the first dynamic partition with a second range of the specified length that includes the first value of the first record, and generating a second dynamic partition having the undefined range of the specified length;
    storing the first record in the second partition; and
    executing a query on the database table by at least determining, based at least on the second range of the second partition, the second partition of the database table is not required by the query, pruning the second partition from the query in response to determining that the second partition is not required by the query, and generating an execution plan for the query that avoids accessing the second partition of the database table.

11. The method of claim 10, wherein the second partition is further generated by at least renaming the first dynamic partition to be associated with the second range such that the first record is inserted in the database table without moving the first record from the first dynamic partition to the second partition.

12. The method of claim 10, further comprising:
    receiving a second statement inserting a second record into the database table; and
    in response to a second value of the second record being outside of the first range of the first partition and the second range of the second partition, generating a third partition by at least replacing the second dynamic partition with a third range of the specified length that includes the second value of the second record, and generating a third dynamic partition having the undefined range of the specified length.

13. The method of claim 10, further comprising:
receiving a second statement dropping one or more empty partitions from the database table;
in response to the second statement, determining that the first partition is empty; and
in response to the first partition being empty, combining the first partition with a non-empty partition having a third range that precedes or follows the first range of the first partition.

14. The method of claim 10, wherein the database table is generated in response to a second statement defining the database table to include the first partition having the first range and the first dynamic partition associated with the undefined range of the specified length.

15. The method of claim 10, wherein the second partition is generated in response to the inserting of the first record, as a part of a periodic process, and/or in response to a user input.

16. A non-transitory computer readable medium storing instructions, which when executed by at least one data processor, result in operations comprising:

generating a database table to include a first partition having a first range and a first dynamic partition associated with an undefined range of a specified length;
receiving a first statement inserting a first record into the database table;
in response to a first value of the first record being outside of the first range of the first partition, generating a second partition by at least replacing the undefined range of the first dynamic partition with a second range of the specified length that includes the first value of the first record, and generating a second dynamic partition having the undefined range of the specified length;
storing the first record in the second partition; and
executing a query on the database table by at least determining, based at least on the second range of the second partition, that the second partition of the database table is not required by the query, pruning the second partition from the query in response to determining that the second partition is not required by the query, and generating an execution plan for the query that avoids accessing the second partition of the database table.

* * * * *